(12) United States Patent
Nago

(10) Patent No.: US 7,554,961 B2
(45) Date of Patent: Jun. 30, 2009

(54) WIRELESS COMMUNICATION APPARATUS, COMMUNICATION SYSTEM AND WIRELESS COMMUNICATION METHOD

(75) Inventor: Hidetada Nago, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/259,811

(22) Filed: Oct. 26, 2005

(65) Prior Publication Data
US 2006/0087995 A1 Apr. 27, 2006

(30) Foreign Application Priority Data
Oct. 27, 2004 (JP) .............................. 2004-312920

(51) Int. Cl.
*H04W 4/00* (2006.01)
(52) U.S. Cl. .................... 370/338; 370/466; 455/435.2; 455/452.2
(58) Field of Classification Search ................ 455/11.1, 455/13.2, 450, 455, 502, 507, 509–510, 515–517, 455/524–526, 435.2, 452.2; 370/310, 321, 370/324, 338, 350, 401, 465, 503, 509, 510, 370/512, 466
See application file for complete search history.

(56) References Cited

U.S. PATENT DOCUMENTS 6,580,704 B1 * 6/2003 Wellig et al. ................. 370/338
7,251,235 B2 * 7/2007 Wentink ...................... 370/338
7,385,960 B2 * 6/2008 Bansal et al. ................ 370/338
2004/0246934 A1 * 12/2004 Kim ............................ 370/338
2006/0039333 A1 * 2/2006 Pirzada et al. ............... 370/338
2007/0064643 A1 * 3/2007 Tavares ...................... 370/328

FOREIGN PATENT DOCUMENTS

| JP | 2003-249939 | 9/2003 |
| JP | 2003-348103 | 12/2003 |
| JP | 2004-72565 | 3/2004 |

* cited by examiner

*Primary Examiner*—Patrick N Edouard
*Assistant Examiner*—Anthony S Addy
(74) *Attorney, Agent, or Firm*—Cowan, Liebowitz & Latman, P.C.

(57) ABSTRACT

After a first wireless terminal device transitions to a Direct Link Protocol mode, the terminal device transmits an ICMP_echo_request signal directly to a second wireless terminal device and, upon receiving an ICMP_echo_reply signal from the second wireless terminal device within a fixed period of time, counts up the number of times there is a reply. If the ICMP_echo_reply signal is not received within a fixed period of time, then the first wireless terminal device counts up the number of non-replies. As a result, the first wireless terminal device can readily judge whether it is capable of communicating directly with the second wireless terminal device in the Direct Link Protocol mode.

11 Claims, 5 Drawing Sheets

| WHEN MPDU IS 1100 BYTES | | | | |
|---|---|---|---|---|
| WIRELESS LINK RATE | MPDU LENGTH | WITH PLCP HEADER APPENDED | (301 COLUMN) | (302 COLUMN) |
| 11Mbps | 0.8ms | 1.0ms | 1.26ms | 2.52ms |
| 5.5Mbps | 1.6ms | 1.8ms | 2.06ms | 4.12ms |
| 2Mbps | 4.4ms | 4.6ms | 4.86ms | 9.72ms |
| 1Mbps | 8.8ms | 9.0ms | 9.26ms | 18.52ms |

WIRELESS COMMUNICATION APPARATUS, COMMUNICATION SYSTEM AND WIRELESS COMMUNICATION METHOD

FIELD OF THE INVENTION

This invention relates to a wireless communication apparatus, a communication system and a wireless communication method. More particularly, the invention is ideal for use in performing wireless communication between wireless communication apparatuses.

BACKGROUND OF THE INVENTION

A wireless LAN (Local Area Network) utilized when a wireless terminal device performs wireless communication now contains access points connected to a wired network [for example, see IEEE 802.11 (1999 Edition)]. In a wireless LAN, there is an infrastructure mode in which an access point arbitrates the access timing of a plurality of wireless terminal devices in a wireless network, and an ad-hoc mode in which access timing is decided between wireless terminal devices.

The infrastructure mode is disadvantageous in that throughput declines in comparison with the ad-hoc mode because of the intervention of the access point. However, access to a wireless LAN or to the Internet can be achieved. With the ad-hoc mode, on the other hand, throughput rises because wireless terminal devices communicate directly. A disadvantage, however, is that a wired LAN and the Internet cannot be accessed. In order to exploit the advantages of both modes, a communication scheme that switches between the infrastructure mode and the ad-hoc mode has been proposed. For example, see the specification of Japanese Patent Application Laid-Open No. 2003-249939 (Prior Art 1).

Further, schemes compliant with IEEE 802.11e/D8.0 (February 2004) are presently being studied in order to implement real-time data communication by the wireless LAN mentioned above. Proposed among these schemes for the purpose of exploiting the advantages of the infrastructure mode and ad-hoc mode is a Direct Link Protocol mode (referred to as the "DLP mode" below) in which wireless terminal devices communicate directly even in the infrastructure mode.

However, in communication in which the infrastructure mode is switched to the ad-hoc mode and communication in which use is made of the DLP mode, a case is conceivable in which despite the fact that communication is possible via an access point, radio waves may not reach from one directly communicating wireless terminal device to another owing to the conditions at the locations where the wireless terminal devices are placed.

Accordingly, the following methods have been proposed as methods of verifying whether direct communication is possible or not:

(1) a method of sending a communicating party a request for performing direct communication via an access point and determining whether or not direct communication is possible based upon whether or not it is possible to confirm whether or not a reply signal can be received [e.g., see the specification of Japanese Patent Application Laid-Open No. 2003-348103 (Prior Art 2)]; and (2) a method of receiving beforehand all radio waves issued by other wireless terminal devices and creating a list of wireless terminal devices from which radio waves could be received, thereby determining whether or not a wireless terminal device is capable of direct communication [e.g., see the specification of Japanese Patent Application Laid-Open No. 2004-072565 (Prior Art 3)].

In the examples of the prior art set forth above, whether or not radio waves will arrive, i.e., whether or not communication is possible, can be determined. However, a case is conceivable in which even though radio waves actually arrive, the wireless link rate must be lowered owing to a poor environment at the time of radio-wave propagation. In such case it is conceivable that throughput, rather than rising, will fall in comparison with communication via an access point. Further, in the case of Prior Art 2 or Prior Art 3, it is necessary to receive all receivable wireless packets over a certain period of time in order to acquire the type of wireless packet or address of the wireless terminal device that is the source of transmission. As a consequence, this processing constitutes a very heavy load. In addition, owing to the heavy load, there is the possibility that no all information will be acquired.

Furthermore, with the prior art described above, whether or not a wireless terminal device capable of direct communication exists can be ascertained. However, unless communication is actually carried out, it is not possible to determine whether an improvement in throughput owing to direct communication will be obtained as compared with a case where communication is performed via an access point.

SUMMARY OF THE INVENTION

Accordingly, an object of the present invention is to select direct communication between wireless communication apparatuses upon taking achievability and effectiveness of direct communication into consideration.

According to the present invention, the foregoing object is attained by providing a wireless communication apparatus comprising:

a communication device for communicating in either a first mode, in which wireless communication is performed with an access point, or a second mode, in which wireless communication is performed directly with another wireless communication apparatus without the intermediary of the access point; and a decision device for deciding the mode of communication with the other wireless communication apparatus in accordance with the speed of communication with the other wireless communication apparatus in the first mode and the speed of communication with the other wireless communication apparatus in the second mode.

Further, according to the present invention, the foregoing object is attained by providing a wireless communication method of performing communication between a first wireless communication apparatus and a second wireless communication apparatus, comprising:

a step of communicating in either a first mode, in which wireless communication is performed with an access point, or a second mode, in which wireless communication is performed directly with a wireless communication apparatus of another party without the intermediary of the access point; and a step of deciding the mode of communication between the first wireless communication apparatus and the second wireless communication apparatus in accordance with the speeds of communication between the first wireless communication apparatus and the second wireless communication apparatus in the first mode and the speeds of communication between the first wireless communication apparatus and the second wireless communication apparatus in the second mode.

Further, according to the present invention, the foregoing object is attained by providing a computer program for causing a computer to execute processing whereby a first wireless terminal device communicates in either a first mode, in which wireless communication is performed with an access point, or a second mode, in which wireless communication is performed directly with a wireless terminal device of another party without the intermediary of the access point, the program causing the computer to execute the following steps:

a first acquisition step of acquiring speed of communication with a communicating party in the first mode;

a second acquisition step of acquiring speed of communication with a communicating party in the second mode; and a decision step of deciding a mode for when communication is performed with the communicating party, the mode being decided in accordance with the communication speed acquired at the first acquisition step and the communication speed acquired at the second acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram illustrating an example of a table used when determining whether communication in a DLP mode is effective or not according to the first embodiment.

DETAILED DESCRIPTION OF THE PREFERRED EMBODIMENTS

First Embodiment

A first embodiment of the present invention will now be described with reference to the drawings. This embodiment will be described taking as an example a case where a wireless terminal device such as a personal computer performs direct communication in the DLP mode defined by IEEE 802.11e/D8.0.

Figure 1:
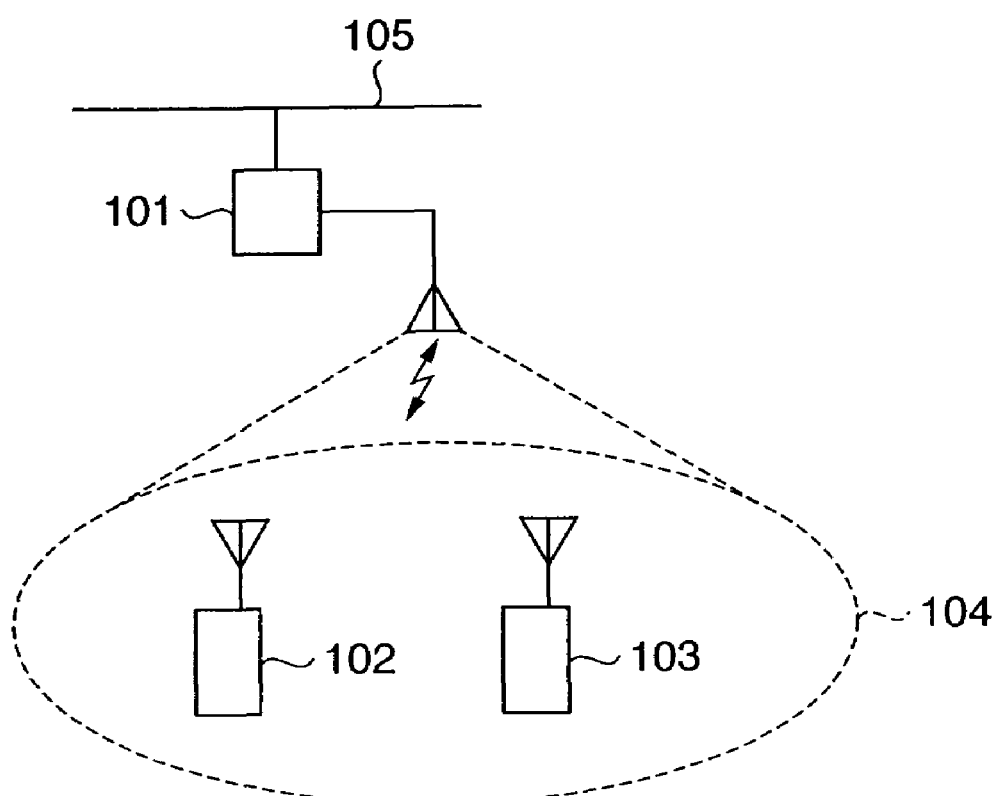
FIG. 1 is a diagram illustrating an example of the configuration of a wireless communication system according to a first embodiment of the present invention.

FIG. 1 is a diagram illustrating an example of the configuration of a wireless communication system according to the first embodiment. This system includes an access point 101, a first wireless terminal device 102 and a second wireless terminal device 103. Reference numeral 104 denotes the communication area of the access point 101.

The first wireless terminal device 102 and second wireless terminal device 103 are present in the communication area 104 of the access point 101 and are wirelessly connected with the access point 101. On the other hand, depending upon the case, the access point 101 is connected to a wireless LAN 105 and implements communication, via the wireless LAN 105, between the wireless terminal devices 102, 103 in the communication area 104.

The access point 101 has a function for providing the communication area 104 with QoS (Quality of Service), which is described in IEEE 802.11e/D8.0, particularly direct communication between the wireless terminal devices 101, 102.

The first wireless terminal device 102 and second wireless terminal device 103 constantly record, and obtain the average value of, the wireless link rate at the time of communication with the access point 101 so that the user may designate when a transition is to be made to communication in the DLP mode.

Figure 2:
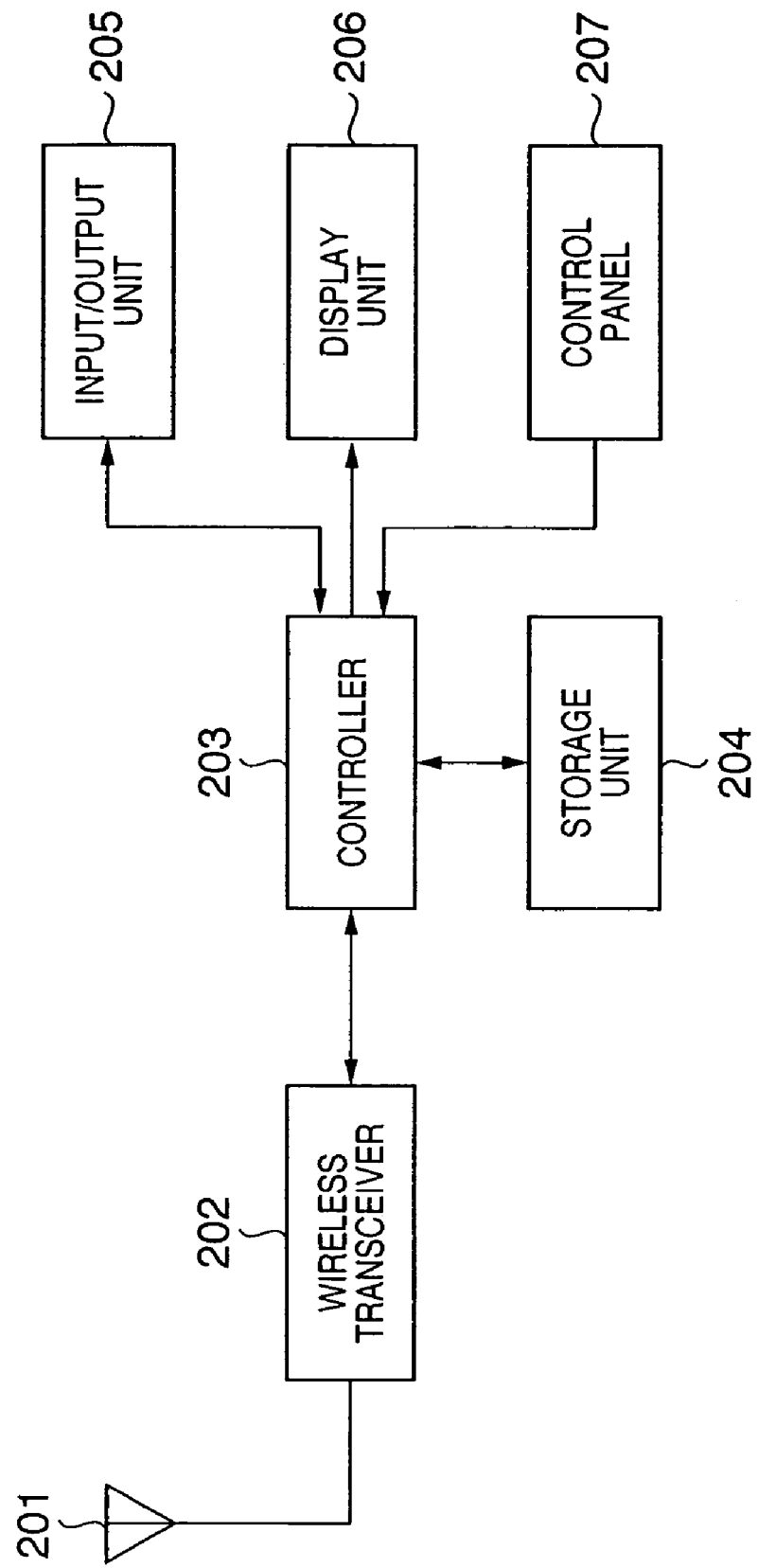
FIG. 2 is a block diagram illustrating an example of the structure of first and second wireless terminal devices according to the first embodiment.

FIG. 2 is a block diagram illustrating an example of the structure of the first and second wireless terminal devices 102, 103.

As shown in FIG. 2, the first and second wireless terminal devices 102, 103 include an antenna 201, a wireless transceiver 202, a controller 203, a storage unit 204, an input/output unit 205, a display unit 206 and a control panel 207.

The wireless transceiver 202 applies processing such as modulation processing to information that has been generated by the controller 203, and outputs the resultant information to the antenna 201. Further, the wireless transceiver 202 applies processing such as demodulation processing to information that has been received by the antenna 201, and outputs the resultant information to the controller 203.

The controller 203 performs overall control of the apparatus and executes various processing in accordance with a control program that has been stored in the storage unit 204.

The storage unit 204 stores the control program, which is executed by the controller 203, and various data. Further, the storage unit 204 stores a table 401 used when determining the effectiveness of communication in the DLP mode. The table 401 will be described further with reference to FIG. 4.

The storage unit 204 also functions as a work area when the controller 203 executes the control program.

The input/output unit 205 connects an external device (printer, etc.) and exchanges data, which relates to audio and video, etc., with the external device.

The display unit 206 presents various displays in accordance with the content of processing executed by the controller 203. For example, the display unit 206 displays the state of communication, described in detail later, performed with another wireless terminal device.

The control panel 207 has various keys for operating the first and second first wireless terminal devices 102, 103. The content of operation by these various keys is output to the controller 203, which executes various processing based upon the content of operation.

An example of processing operation by the first and second wireless terminal devices 102, 103 and access point 101 in the above arrangement will now be described. Described first will be a processing operation performed when the first and second wireless terminal devices 102, 103 execute communication. It goes without saying that processing operations other than these can also be performed by the first and second wireless terminal devices 102, 103 and access point 101.

In a case where data is communicated from the first wireless terminal device 102 to the second wireless terminal device 103 via the access point 101 shown in FIG. 1, the IP address of the second wireless terminal device 103 is appended as a destination to the header of the data desired to be sent, and the IP address of the first wireless terminal device 102 is appended as a transmission source to the header of this data. Next, the MAC (Media Access Control) address of the access point 101 is appended as a destination MAC address to the beginning of the data to which the IP address has been appended, and the MAC address of the first wireless terminal device 102 is appended as the MAC address of the transmission source. The data to which the MAC addresses have been appended is transmitted to the access point 101.

The access point 101 that has received this data removes the destination MAC address and the transmission-source MAC address from the data. The access point 101 then checks the IP address that has been appended as the destination and therefore ascertains, in this example, that the destination is the second wireless terminal device 103. Accordingly, the access point 101 appends the MAC address of the second wireless terminal device 103 in front of this IP address as the destination MAC address and appends the MAC address of the access point 101 as the transmission-source MAC address.

The access point 101 subsequently sends the second wireless terminal device 103 the data to which these MAC addresses have been appended. Upon receiving this data, the second wireless terminal device 103 removes the destination MAC address and the transmission-source MAC address from the data. The second wireless terminal device 103 then confirms that the IP address appended as the destination to the header of the data is its own IP address (the IP address of the second wireless terminal device 103) and ascertains that the transmission source is the first wireless terminal device 102.

Similar processing is executed in a case where data is transmitted from the second wireless terminal device 103 to the first wireless terminal device 102.

Figure 3:
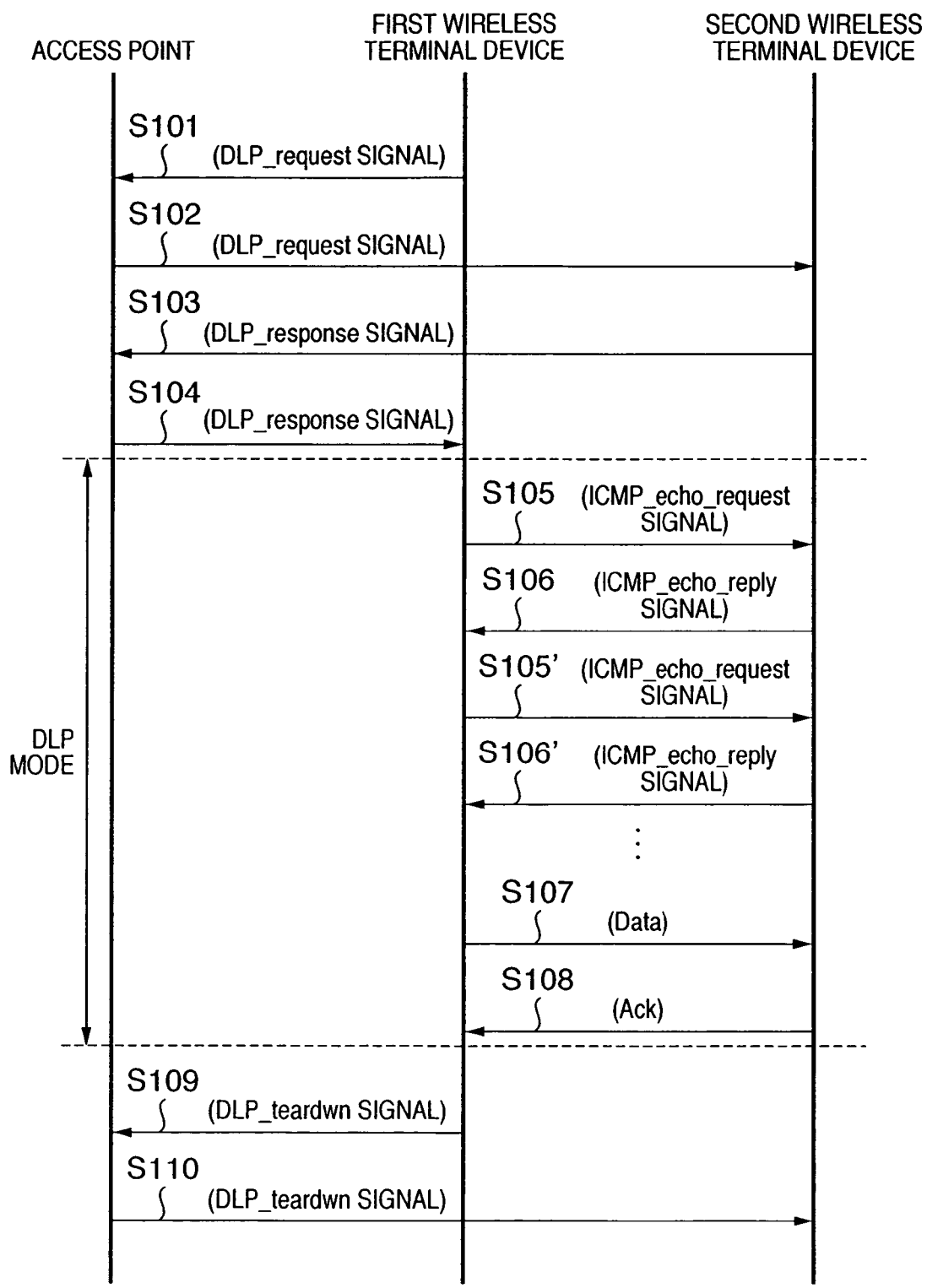
FIG. 3 is a diagram illustrating an example of an operating sequence when a first wireless terminal device, second wireless terminal device and access point communicate according to the first embodiment.

An operating sequence shown in FIG. 3 is executed in a case where the first wireless terminal device 102 connected to the access point 101 communicates with the second wireless terminal device 103 in the DLP mode as described in IEEE 802.11e/D8.0.

First, the first wireless terminal device 102 sends a DLP_request signal, which is a request to the effect that this device wishes to communicate with the second wireless terminal device 103 in the DLP mode, to the second wireless terminal device 103 via the access point 101 (steps S101, S102). The DLP_request signal includes the MAC address of the first wireless terminal device 102 and information necessary to perform communication in the DLP mode, namely the type of application.

Upon receiving the DLP_request signal, the second wireless terminal device 103 sends a DLP_response signal, which indicates acceptance of the request that communication be performed in the DLP mode, to the first wireless terminal device 102 via the access point 101. The DLP_response signal includes the MAC address of the second wireless terminal device 103 and information necessary to perform communication in the DLP mode, such as information for notifying of the fact communication in the DLP mode has been accepted. After the DLP_response signal is transmitted to the first wireless terminal device 102 via the access point 101 (step S103), the second wireless terminal device 103 transitions to communication in the DLP mode. The first wireless terminal device 102, on the other hand, transitions to communication in the DLP mode after the DLP_response signal is received (step S104).

After the transition to communication in the DLP mode, the first wireless terminal device 102, which has transmitted the DLP_request signal, transmits an ICMP_echo_request signal toward the second wireless terminal device 103 in order to check whether it is capable of communicating directly with the second wireless terminal device 103 (step S105). Unlike the DLP_request signal, the ICMP_echo_request signal is such that both the destination MAC address and destination IP address are those of the second wireless terminal device 103. In other words, the ICMP_echo_request signal is transmitted directly to the second wireless terminal device 103 without the intermediary of the access point 101.

Upon receiving the ICMP_echo_request signal, the second wireless terminal device 103 transmits a ICMP_echo_reply signal to the first wireless terminal device 102 (step S106). The ICMP_echo_reply signal, which is such that both the destination MAC address and destination IP address are those of the first wireless terminal device 102, is transmitted directly to the first wireless terminal device 102. It should be noted that the first wireless terminal device 102 records the wireless link rate that prevailed when the ICMP_echo_request signal was transmitted and the wireless link rate that prevailed when the ICMP_echo_reply signal was received.

Next, the first wireless terminal device 102 adopts this wireless link rate as the wireless link rate prevailing at the time of communication based upon the DLP mode and compares it with the wireless link rate that prevails when communication is performed via the access point 101. If it is determined as a result of the comparison that communication in the DLP mode is effective, then the first wireless terminal device 102 executes communication in the DLP mode (steps S107, S108). If it is determined that such communication is not effective, then the first wireless terminal device 102, via the access point 101, notifies the second wireless terminal device 103 of end of communication in the DLP mode (steps S109, S110).

Figure 5:
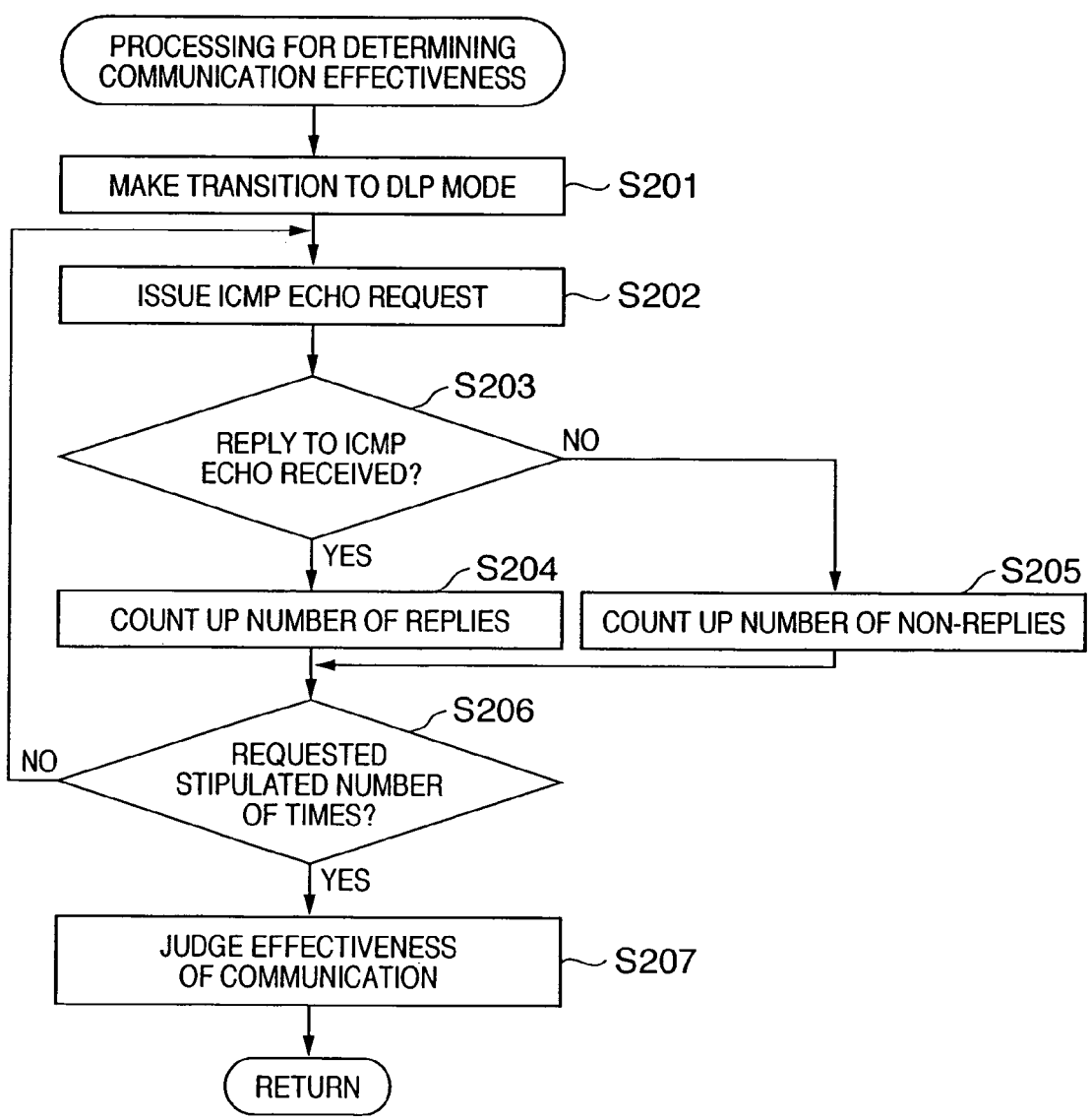
FIG. 5 is a flowchart for describing an example of processing for determining whether communication in a DLP mode is effective or not according to the first embodiment.

FIG. 5 is a flowchart illustrating an example of processing for determined whether communication in the DLP mode is effective or not.

With only a single exchange of the ICMP_echo_request signal and ICMP_echo_reply signal (steps S105, S106), the reliability of the result of determining whether communication in the DLP mode is implementable or not will be low because the number of signal exchanges is too small. In addition, the measurement of wireless link rate will also have little reliability. For this reason, this embodiment is so adapted that the exchange of the ICMP_echo_request signal and ICMP_echo_reply signal is executed a plurality of times. Further, this embodiment is so adapted that the wireless terminal device that transmitted the DLP_request signal judges the effectiveness of communication in the DLP mode.

After the DLP_response signal is transmitted from the second wireless terminal device 103 to the first wireless terminal device 102, the first and second wireless terminal devices 102, 103 transition to communication in the DLP mode (step S201). Next, the first wireless terminal device 102 transmits the ICMP_echo_request signal toward the second wireless terminal device 103 (step S202).

The first wireless terminal device 102 then determines whether the ICMP_echo_reply signal corresponding to the ICMP_echo_request signal has been received within a fixed period of time (step S203). If the result of the determination is that the ICMP_echo_reply signal could not be received within the fixed period of time ("NO" at step S203), then the first wireless terminal device 102 determines that there is no reply from the second wireless terminal device 103 and counts up the number of times there is no reply (step S205).

On the other hand, if the ICMP_echo_reply signal could be received within the fixed period of time ("YES" at step S203), then the first wireless terminal device 102 determines that there has been a reply from the second wireless terminal device 103 and counts the number of replies (step S204). At the same time, the first wireless terminal device 102 records the wireless link rate that prevailed when the ICMP_echo_request signal was transmitted and the wireless link rate that prevailed when the ICMP_echo_reply signal was received. At this time it is preferred to so arrange it that the first wireless terminal device 102 obtains the average value between this rate and the already recorded wireless link rate and records the obtained average value of the wireless link rates.

The first wireless terminal device 102 checks to determine whether the ICMP_echo_request signal has been transmitted a stipulated number of times set in advance (step S206) and repeats the processing of steps S202 to S206 until transmission has been performed the stipulated number of times. When it is determined that transmission the stipulated number of times has ended ("YES" at step S206), the first wireless terminal device 102 judges the effectiveness of communication in the DLP mode (step S207).

How the effectiveness of communication in the DLP mode is judged will now be described. The main points of this judgment are the wireless LAN frame format and transmission waiting time, which are set forth in IEEE 802.11 (1999 Edition). As one example, if the length of an MPDU (MAC Protocol Data Unit) is 1100 bytes, then the temporal length of the MPDU becomes a value, which depends upon the wireless link rate, indicated in the "MPDU Length" column of table 401 shown in FIG. 4. In view the specifications of the wireless LAN, the wireless link rate in the header of a PLCP (Physical Layer Convergence Protocol) is fixed, at approximately 200 μs, regardless of the wireless link rate of the MPDU.

That is, the total time of the PLCP header and MPDU is a value indicated in a "With PLCP Header Appended" column in table 401 shown in FIG. 4. In the case of fastest waiting time, after the first data transmission, the system must wait 260 μs until the next data transmission in accordance with the specifications of the wireless LAN. That is, the total of time needed to transmit data and waiting time is the value indicated in a "301 Column" in table 401 shown in FIG. 4.

In a case where data is transmitted via the access point 101, the next item of data will not be transmitted until elapse of the time required for data to reach the access point 101 from the local wireless terminal device (e.g., the first wireless terminal device 102) and of the time required for data to reach the wireless terminal device of the other party (e.g., the second wireless terminal device 103) from the access point 101. As a result, it is necessary to wait for the time indicated in a "302 Column" in table 401 of FIG. 4 even at the highest rate. In FIG. 4, the values indicated in the "302 Column" are approximately double the values indicated in the "301 Column".

In the case of this embodiment, the values in the "301 Column" indicate times that are the same as data transmission times at the highest rate at the time of direct communication, and the values in the "302 Column" indicate times that are the same as data transmission times at the highest rate at the time of communication via the access point 101. Accordingly, in order to determine whether communication in the DLP mode is effective, it will suffice to compare the wireless link rate in the DLP mode and the wireless link rate at the time of communication via the access point 101 using the values shown in the "301" column and the values shown in the "302" column of table 401 illustrated in FIG. 4.

By way of example, DLP communication is slightly faster when the wireless link rate at the time of communication via the access point 101 is 11 Mbps and the wireless link rate in the DLP mode is 5.5 Mbps. That is, whereas the value in the "302 Column" when the wireless link rate is 11 Mbps is 2.52 ms, the value in the "301 Column" when the wireless link rate is 5.5 Mbps is 2.06 ms. Accordingly, it is judged that communication in the DLP mode should be executed.

On the other hand, when the wireless link rate at the time of communication via the access point 101 is 11 Mbps and the wireless link rate in the DLP mode is 2 Mbps, for example, it can be expected that throughput will be higher when communication is performed via the access point 101 rather than when communication is executed in the DLP mode. That is, whereas the value in the "302 Column" when the wireless link rate is 11 Mbps is 2.52 ms, the value in the "301 Column" when the wireless link rate is 2 Mbps is 4.86 ms. Accordingly, it is judged that communication in the DLP mode should be terminated and that communication should be performed via the access point 101.

Thus, in this embodiment, as described above, the first wireless terminal device 102 transmits the ICMP_echo_request signal to the second wireless terminal device 103 directly after the transition to the DLP mode is made. When the first wireless terminal device 102 receives the ICMP_echo_reply signal as a reply from the second wireless terminal device 103 within a fixed period of time, the first wireless terminal device 102 counts up the number of times the reply is received. On the other hand, if the ICMP_echo_reply signal is not received within the fixed period of time, the first wireless terminal device 102 counts up the number of times there is no reply. By adopting this arrangement, the first wireless terminal device 102 can readily determine whether it is capable of communicating directly with the second wireless terminal device 103 in the DLP mode.

Further, the first wireless terminal device 102 stores the wireless link rate the prevails when it communicates with the access point 101 and also stores the wireless link rate that prevails when it communicates with the second wireless terminal device 103 in the DLP mode, and judges whether to perform or terminate communication in the DLP mode in accordance with the result obtained when the stored wireless link rates are compared. If it is judged that direct communication with the second wireless terminal device 103 results in more effective communication than communication with the second wireless terminal device 103 via the access point 101, then the first wireless terminal device 102 communicates in the DLP mode. If this is not the case, then the first wireless terminal device 102 terminates communication in the DLP mode. Thus, the first wireless terminal device 102 can compare the speed of communication with the access point 101 and the speed of communication with the second wireless terminal device 103 in the DLP mode and can easily determine whether communication in the DLP mode is effective.

Furthermore, the first wireless terminal device 102 stores the average value of wireless link rate the prevails when it communicates with the access point 101 and also stores the average value of wireless link rate that prevails when it communicates with the second wireless terminal device 103 in the DLP mode. As a result, the reliability of the wireless link rate can be improved and the first wireless terminal device 102 can accurately determine whether communication in the DLP mode is effective.

In this embodiment, the ICMP_echo_request signal and the ICMP_echo_reply signal are used as the method of searching for a party for communication in the DLP mode and checking the wireless link rate at this time. However, the method of checking the wireless link rate is not limited to this. For example, it is obvious that operation would be similar to that of the wireless communication system of this embodiment even if combined use were made of a separate, independent DLP terminal reply request signal and a DLP terminal reply signal that is the reply to this signal.

Further, the number of times a reply is not received is counted up in a case where the ICMP_echo_reply signal is not received within a fixed period of time. However, it may be so arranged that communication in the DLP mode is terminated forcibly in such case.

Furthermore, this embodiment is such that when it is judged that communication in the DLP mode is not effective, the end of communication in the DLP mode is reported to the second wireless terminal device 103 via the access point 101. However, it may be so arranged that the end of communication in the DLP mode is reported to the second wireless terminal device 103 directly without the intermediary of the access point 101.

Second Embodiment

A second embodiment of the present invention will now be described. Components identical with those of the first embodiment will be designated by the same reference characters as those used in FIGS. 1 to 5 and need not be described again.

The method described in the first embodiment above can also be applied to a case where communication is performed upon making a transition from the infrastructure mode to the ad-hoc mode. In the embodiment set forth below, a case where communication is performed by switching between the infrastructure and ad-hoc modes will be described.

The configuration of the wireless communication system according to this embodiment is the same as that shown in FIG. 1. The first wireless terminal device 102 and the second wireless terminal device 103 are in the infrastructure mode in a state in which they are wirelessly connected to the access point 101. The first wireless terminal device 102 and second wireless terminal device 103 constantly record, and obtain the average value of, the wireless link rate at the time of communication with the access point 101 so that the user may designate when a transition is to be made to communication in the ad-hoc mode.

In a case where the first wireless terminal device 102 connected to the access point 101 in the infrastructure mode communicates with the second wireless terminal device 103 in the ad-hoc mode, the DLP_request signal in the operating sequence shown in FIG. 3 becomes the ad-hoc communication request signal. The first wireless terminal device 102 transmits the ad-hoc communication request signal to the second wireless terminal device 103 via the access point 101 to thereby notify of the fact that ad-hoc communication is desired (steps S101, S102). The ad-hoc communication request signal includes information necessary for ad-hoc communication, such as the MAC address and IP address of the first wireless terminal device and the radio channel used at the time of ad-hoc communication.

Upon receiving the ad-hoc communication request signal, the second wireless terminal device 103 sends an ad-hoc communication verification signal, which indicates acceptance of the ad-hoc communication request signal, to the first wireless terminal device 102 via the access point 101 (steps S103, S104). The ad-hoc communication verification signal includes the MAC address and IP address of the second wireless terminal device and information necessary to perform ad-hoc communication, such as information for notifying of the fact communication in the ad-hoc mode has been accepted. After the ad-hoc communication verification signal is transmitted, the second wireless terminal device 103 transitions to communication in the ad-hoc mode.

After the transition to the ad-hoc mode, the first wireless terminal device 102, which has issued the ad-hoc communication request signal, transmits the ICMP_echo_request signal toward the second wireless terminal device 103 in order to check whether it is capable of communicating directly with the second wireless terminal device 103 (step S105). The ICMP_echo_request signal is such that both the destination MAC address and destination IP address are those of the second wireless terminal device 103.

Upon receiving the ICMP_echo_request signal, the second wireless terminal device 103 transmits the ICMP_echo_reply signal to the first wireless terminal device 102 (step S106). The ICMP_echo_reply signal, is such that both the destination MAC address and destination IP address are those of the first wireless terminal device 102. The first wireless terminal device 102 records the wireless link rate that prevailed when the ICMP_echo_request signal was transmitted and the wireless link rate that prevailed when the ICMP_echo_reply signal was received.

The first wireless terminal device 102 then adopts this wireless link rate as the wireless link rate prevailing in the ad-hoc mode and compares it with the wireless link rate that prevails when communication is performed via the access point 101. If it is determined as a result of the comparison that communication in the ad-hoc mode is effective, then the first wireless terminal device 102 executes communication in the ad-hoc mode. If it is determined that this communication is not effective, then the first wireless terminal device 102 notifies the second wireless terminal device 103 of end of communication in the ad-hoc mode. If communication with the other party could not be achieved in the ad-hoc mode, then both the first and second wireless terminal devices 102, 103 are wirelessly connected again with the access point 101 after a predetermined infrastructure-restoration timer, which is used when communication becomes impossible, satisfies a certain condition, and the mode is restored to the infrastructure mode. The method of determining whether to perform communication in the ad-hoc mode or to restore the infrastructure mode is the same as that of the first embodiment (see FIG. 5).

In this embodiment, the ICMP_echo_request signal and the ICMP_echo_reply signal are used as the method of searching for a party for communication in the ad-hoc mode and checking the wireless link rate at this time. However, the method of checking the wireless link rate is not limited to this. For example, it is obvious that operation would be similar to that of the wireless communication system of this embodiment even if combined use were made of a separate, independent ad-hoc communication terminal reply request signal and an ad-hoc communication terminal reply signal that is the reply to this signal. Further, in each of the foregoing embodiments, an example in which the wireless terminal devices are personal computers is described. However, the wireless terminal device may be a device such as a printer, digital camera or hard-disk device. The device may also be a wireless communication adapter such as a wireless LAN card.

Other Embodiments

The scope of the present invention also covers a case where program codes of software for implementing the functions of the foregoing embodiments are supplied to a computer within an apparatus or system connected to various devices in such a manner that these various devices will be caused to operate to implement the functions of the foregoing embodiments, and the various devices are operated in accordance with a program that has been stored in the computer (CPU or MPU) of the system or apparatus.

In this case, the program codes per se of the software implement the functions of the foregoing embodiments, and the program codes per se and the means for supplying these program codes to the computer, e.g., a recording medium storing the program codes, constitute the present invention. Examples of storage media that can be used for storing the program code are a flexible disk, hard disk, optical disk, magneto-optical disk, CD-ROM, magnetic tape, non-volatile type memory card or ROM, etc. Furthermore, besides the case where the aforesaid functions according to the embodiments are implemented by executing the program codes supplied to a computer, it goes without saying that the program codes are covered by the present invention also in a case where the program codes cooperate with an operating system or other application software, which is running on the computer, to implement the functions of the embodiments.

It goes without saying that the present invention further covers a case where, after the supplied program codes are stored in a memory provided on a function expansion board of a computer or in a function expansion unit connected to the computer, a CPU or the like on in the function expansion board or in the function expansion unit performs all or a part of the entire actual processing based upon the designation of program codes and implements the functions of the above embodiments by this processing.

In accordance with the embodiment of the present invention, direct communication by a wireless communication apparatus can be executed taking achievability and effectiveness of direct communication into consideration.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-312920 filed Oct. 27, 2004, which is hereby incorporated by reference herein.

What is claimed is:

1. A wireless communication apparatus comprising:
a communication device capable of communicating in either a first mode, in which a wireless communication is performed with another wireless communication apparatus via an access point, or a second mode, in which the wireless communication is performed directly with the another wireless communication apparatus without an intermediary of the access point; and
a first determination device configured to determine communication speed between the wireless communication apparatus and the access point based upon a signal communicated in the first mode;
a second determination device configured to determine communication speed between the wireless communication apparatus and the another wireless communication apparatus based upon a signal communicated in the second mode; and
a selection device configured to select a mode to be communicated with the another wireless communication apparatus based upon a comparison result of the communication speed determined by the first determination device with the communication speed determined by the second determination device.

2. The apparatus according to claim 1, further comprising:
a first transmitting device for transmitting a reply request signal, which is for verifying whether communication is possible or not, to the other wireless communication apparatus, which has transitioned to the second mode, after a transition is made from the first mode to the second mode; and
a first receiving device for receiving a request response signal that has been transmitted from the other wireless communication apparatus in response to the reply request signal;

wherein the second determination device determines the communication speed with the another wireless communication apparatus in the second mode based upon the request response signal received by said receiving device.

3. The apparatus according to claim 1, further comprising:
a second transmitting device for transmitting a direct-communication request signal, which is for requesting a change of mode from the first mode to the second mode, to the another wireless communication apparatus, which is in the first mode, via the access point in a case where the first mode is in effect; and
a second receiving device for receiving a direct-communication reply signal, which has been transmitted from the other wireless communication apparatus via the access point, wherein the direct-communication reply signal is a response signal of the direct-communication request signal;
wherein the selection device executes processing for selecting a mode that conforms to the comparison result of the communication speed in accordance with receipt of the direct-communication replay signal by said second receiving device.

4. The apparatus according to claim 1, further comprising:
a first recording device for recording a link rate in a wireless layer in the first mode as a first wireless link rate, the link rate being the communication speed determined by the first determination device; and
a second recording device for recording link rate in a wireless layer in the second mode as a second wireless link rate, the link rate being the communication speed determined by the second determination device;
wherein the selection device selects a mode to be communicated with the another wireless communication apparatus based upon a comparison result of the first wireless link with the second wireless link rate.

5. The apparatus according to claim 4, wherein the first recording device records a first wireless link rate decided from among link rates in a wireless layer when communication with the access point is performed a plurality of times in the first mode; and
the second recording device records a second wireless link rate decided from among link rates in a wireless layer when communication with the another wireless communication apparatus is performed a plurality of times in the second mode.

6. The apparatus according to claim 5, wherein said first recording device records, as the first wireless link rate, an average of the link rates in the wireless layer when communication with the access point is performed a plurality of times, and said second recording device records, as the second wireless link rate, an average of the link rates in the wireless layer when communication with the another wireless communication apparatus is performed a plurality of times.

7. The apparatus according to claim 1, wherein the second mode is a mode in which wireless communication is performed directly with the another wireless communication apparatus when a wireless LAN remains in an infrastructure mode.

8. The apparatus according to claim 1, wherein the second mode is an ad-hoe mode of a wireless LAN.

9. A communication system having a plurality of the wireless communication apparatuses set forth in claim 1, and the access point.

10. A wireless communication method of performing communication between a first wireless communication apparatus and a second wireless communication apparatus, comprising:

a step of communicating in either a first mode, in which a wireless communication is performed with another wireless communication apparatus via an access point, or a second mode, in which the wireless communication is performed directly with the another wireless communication apparatus without an intermediary of the access point; and a first determination step of determining a communication speed between the wireless communication apparatus and the access point based upon a signal communicated in the first mode;

a second determination step of determining a communication speed between the wireless communication apparatus and the another wireless communication apparatus based upon a signal communicated in the second mode; and a selection step of selecting a mode to be communicated with the another wireless communication apparatus based upon a comparison result of the communication speed determined in the first determination step with the communication speed determined in the second determination step.

11. A computer-readable storage medium storing a computer program code for causing a computer to execute processing whereby a first wireless terminal device communicates in either a first mode, in which a wireless communication is performed with another wireless terminal device via an access point, or a second mode, in which the wireless communication is performed directly with the another wireless terminal device without an intermediary of the access point, said computer program code causing the computer to execute the following steps:

a first acquisition step of acquiring a speed of communication between the wireless terminal device and the access point based upon a signal communicated in the first mode;

a second acquisition step of acquiring a speed of communication between the wireless terminal device and the another wireless terminal device based upon a signal communicated in the second mode; and a selection step of selecting a mode to be communicated with the another wireless terminal device based upon a comparison result of the communication speed determined in the first acquisition step with the communication speed determined in the second acquisition step.

* * * * *